US008751281B2

(12) United States Patent
Chaushev

(10) Patent No.: US 8,751,281 B2
(45) Date of Patent: Jun. 10, 2014

(54) METHOD FOR ACQUIRING BY A SESSION MANAGER A LIST OF ACTIVE SESSIONS

(75) Inventor: Rosen Chaushev, Sofia (BG)

(73) Assignee: SAP AG, Walldorf (DE)

( * ) Notice: Subject to any disclaimer, the term of this patent is extended or adjusted under 35 U.S.C. 154(b) by 368 days.

(21) Appl. No.: 12/408,618

(22) Filed: Mar. 20, 2009

(65) Prior Publication Data
US 2010/0241479 A1  Sep. 23, 2010

(51) Int. Cl.
*G06Q 10/00* (2012.01)

(52) U.S. Cl.
USPC .................. 705/7.21; 705/7.12; 705/7.22

(58) Field of Classification Search
USPC .............................. 705/7.11–7.42
See application file for complete search history.

(56) References Cited

U.S. PATENT DOCUMENTS

| | | | | |
|---|---|---|---|---|
| 6,519,643 | B1 * | 2/2003 | Foulkes et al. | 709/227 |
| 7,051,105 | B2 * | 5/2006 | Lauzon et al. | 709/227 |
| 7,236,939 | B2 * | 6/2007 | Chen et al. | 705/9 |
| 2003/0002634 | A1 * | 1/2003 | Gupta et al. | 379/88.13 |
| 2004/0054566 | A1 * | 3/2004 | J'Maev | 705/7 |
| 2004/0199541 | A1 * | 10/2004 | Goldberg et al. | 707/104.1 |
| 2005/0262472 | A1 * | 11/2005 | Wood et al. | 717/102 |
| 2005/0283445 | A1 * | 12/2005 | Trinon et al. | 705/75 |
| 2007/0156888 | A1 * | 7/2007 | Hilerio et al. | 709/224 |
| 2007/0282951 | A1 * | 12/2007 | Selimis et al. | 709/205 |
| 2008/0049971 | A1 * | 2/2008 | Ramos et al. | 382/100 |

OTHER PUBLICATIONS

Collins et al. "Processual Management Using Intelligent Workflow Systems" (1999) Proceedings of 5th International Conference of the Decision Science Institute.*
Chen et al. "Dynamic-Agents for Dynamic Service Provisioning" (Aug. 1998) IEEE Computer Society.*
Meng "Achieving Dynamic Inter-Organizational Workflow Management by Integrating Business Processes, E-Services, Events and Rules" (2002) University of Florida, UMI No. 3052362.*
Java Event Handling, Chapter 4: Event Listeners (2001) Pearson Education (http://www.ablongman.com/samplechapter/0130418021.pdf).*
"The SAP Session Manager" (1998) SAP (http://help.sap.com/printdocu/core/print40b/EN/pdf/bcfessem.pdf).*
"Oracle Application Server TopLink Application Developer's Guide 10g (9.0.4), Part No. B10313-01", http://www.deakin.edu.au/its/dba/oracle-doco/9.0.4.1/9.0.4_doc_library/mix.904/b10488/idx-q.htm, pp. 1-72.

* cited by examiner

*Primary Examiner* — Sujay Koneru
(74) *Attorney, Agent, or Firm* — Brake Hughes Bellermann LLP

(57) ABSTRACT

According to one general aspect, a method may include acquiring, by a session manager, a list of active sessions. In various embodiments, each session may include a grouped plurality of sub-tasks that are configured to be sequentially performed in order to accomplish a business management task. In some embodiments, the method may include receiving a selection of one of the sessions to supervise. In one embodiment, the method may include retrieving a list of the at least one event listener(s) from a session context associated with the selected session. In another embodiment, the method may include receiving events generated by the session.

18 Claims, 9 Drawing Sheets

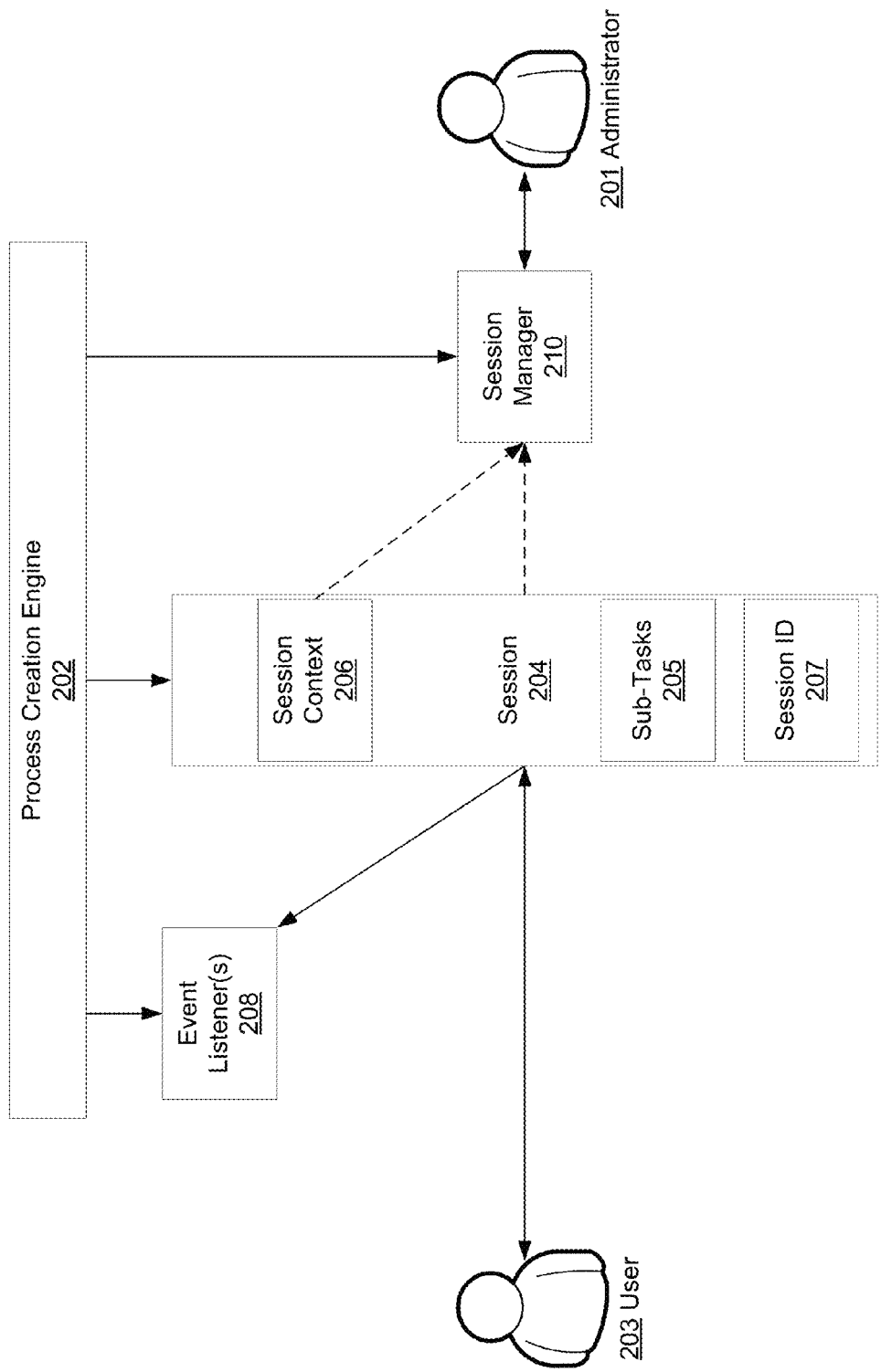

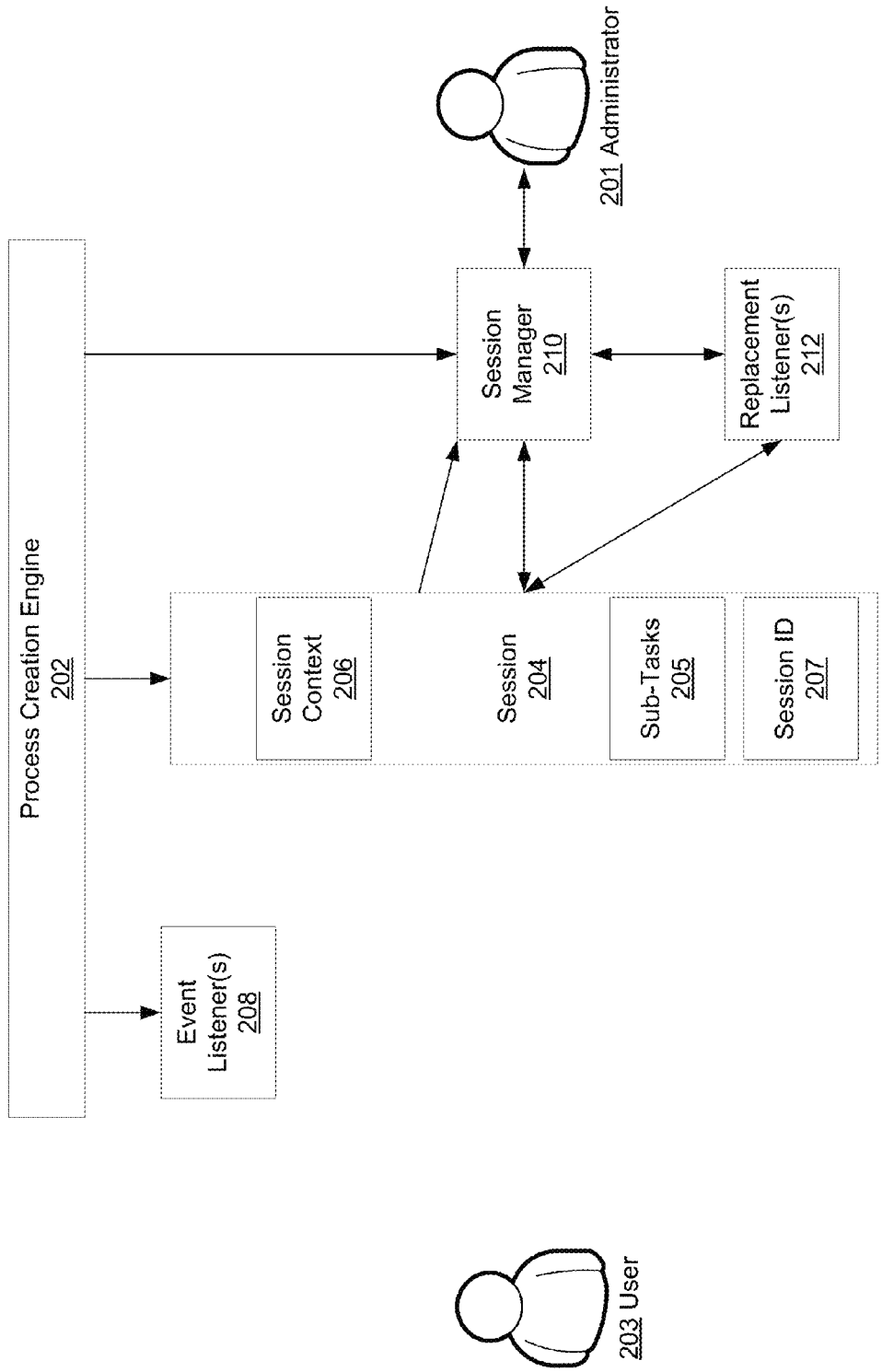

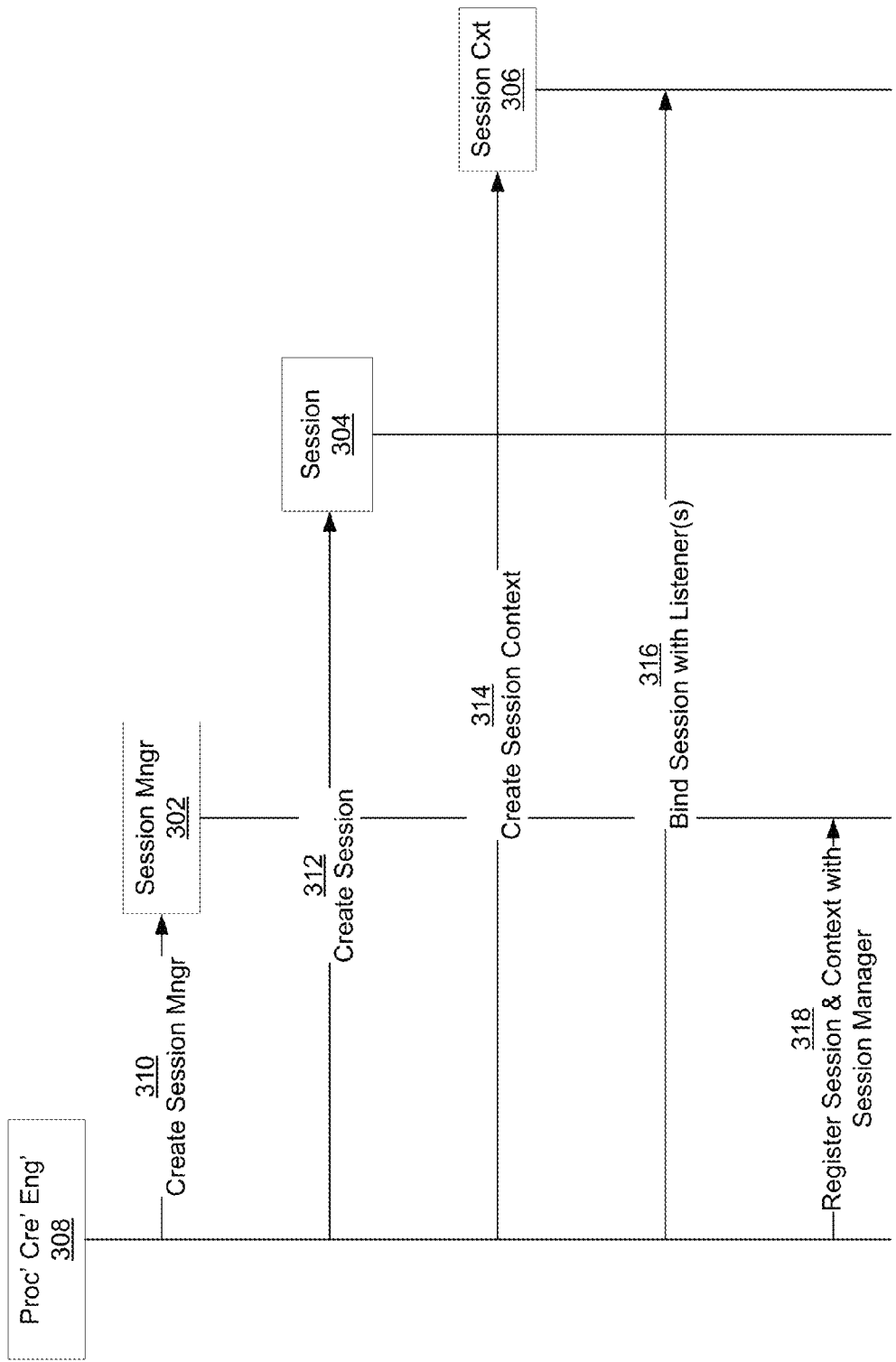

702 Receiving, by a session manger, a registration notification that a session has been created and is scheduled to be performed by a system that includes session manger 704 Acquiring, by a session manager, a list of active sessions 706 Receiving a selection of one of the sessions to supervise 708 Retrieving a list of the at least one event listener(s) from a session context associated with the selected session 710 Receiving events generated by the session 712 Editing the execution status of at least one of the sub-tasks included by the selected session

METHOD FOR ACQUIRING BY A SESSION MANAGER A LIST OF ACTIVE SESSIONS

TECHNICAL FIELD

This description relates to business management, and more specifically to the monitoring and control of the processing of business management tasks.

BACKGROUND

Enterprise resource planning (ERP) is typically the planning of how business resources (e.g., inventory, employees, customers, etc.) are acquired and flow through the business process associated with each resource. Frequently, ERP includes the capture, storage and analysis of information relating to the tracked resources. In various cases ERP may be divided into sub-categories or systems pertaining to financials, human capital management, materials management, customer relationship management, sales & distribution, and production planning, corporate services, and/or general operations management. In general, a well executed ERP system enhances productivity and provides insight to a business. Often an ERP customer may wish to keep their ERP data secret from their competitors and more generally the world.

Customer relationship management (CRM) is typically the practice of intelligently finding, marketing to, selling to, and servicing customers. Frequently, CRM includes the capture, storage, and analysis of information relating to customers, vendors, partners, and/or internal systems. Often a customer may wish to keep their customer relationship management data secret from their competitors and more generally the world.

Other typical business management activities may include, for example, Supplier Relationship Management (SRM), Product Lifecycle Management (PLM), Supply Chain Management (SCM), etc.

Often synthesizing information from multiple systems, in the context of ERP or CRM applications or in other settings, includes performing or executing multiple jobs on a distributed network of computing systems. The plurality of jobs or tasks may be arranged in a workflow or session that dictates, for example, the order and precedence of the jobs or tasks.

SUMMARY

According to one general aspect, a method may include acquiring, by a session manager, a list of active sessions. In various embodiments, each session may include a grouped plurality of sub-tasks that are configured to be sequentially performed in order to accomplish a business management task. In some embodiments, the method may include receiving a selection of one of the sessions to supervise. In one embodiment, the method may include retrieving a list of the at least one event listener(s) from a session context associated with the selected session. In another embodiment, the method may include receiving events generated by the session.

According to another general aspect, an apparatus may include an active session lister configured to acquire a list of active sessions. In various embodiments, each session may include a grouped plurality of sub-tasks that are configured to be sequentially performed in order to accomplish a business management task. In one embodiment, the apparatus may include a session selector configured to receive a selection of one of the sessions to supervise. In another embodiment, the apparatus may include a session event listener manager configured to retrieve a list of the at least one event listener(s) from a session context associated with the selected session, and receive event information generated by the session.

According to another general aspect, a computer program product, may comprise a computer usable medium having a computer readable program code embodied therein, the computer readable program code adapted to be executed to implement a method for the managing a session. In such an embodiment, each session may include a grouped plurality of sub-tasks that are configured to be sequentially performed in order to accomplish a business management task. In some embodiments, the method may include acquiring, by a session manager, a list of active sessions. In another embodiment, the method may include receiving a selection of one of the sessions to supervise. In various embodiments, the method may include retrieving a list of the at least one event listener(s) from a session context associated with the selected session. In some embodiments, the method may include receiving events generated by the session.

The details of one or more implementations are set forth in the accompanying drawings and the description below. Other features will be apparent from the description and drawings, and from the claims.

A system and/or method for managing a series of sub-tasks, substantially as shown in and/or described in connection with at least one of the figures, as set forth more completely in the claims.

BRIEF DESCRIPTION OF THE DRAWINGS

FIG. 3 is a block diagram of an example embodiment of a system in accordance with the disclosed subject matter.

FIG. 7 is a flow chart of an example embodiment of a technique in accordance with the disclosed subject matter.

DETAILED DESCRIPTION

Figure 1:
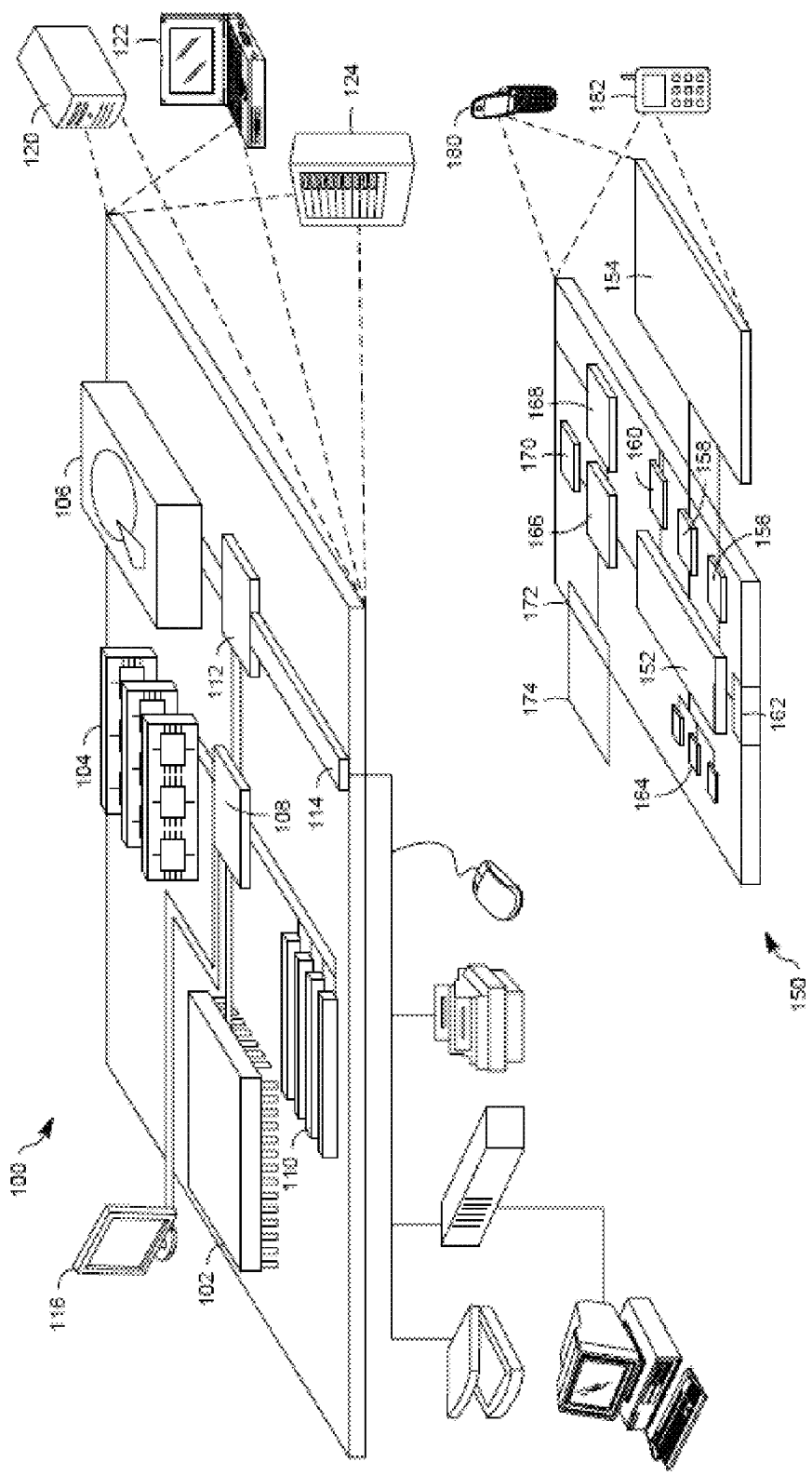
FIG. 1 is a block diagram of example embodiments of apparatuses in accordance with the disclosed subject matter.

In various embodiments and as described below, users may execute or run a plurality of sub-tasks that are configured to be sequentially performed in order to accomplish a business management task (e.g., a session). Traditionally, privileged users (e.g., software architects, designers, developers, administrators, etc.) may have only been able to review or monitor these tasks at an operating system level, in which case the sub-tasks may be visible but not the flow of the sequentially performed sub-tasks or the business management task as a whole. In another traditional usage, the privileged user may have only been able to monitor or control this plurality of sub-tasks on an ad hoc basis.

In various embodiments, the disclosed subject matter may help and/or guide privileged users (e.g., software architects, designers developers, administrators, etc.) to create and keep a central Session Manager. In various embodiments, this central Session Manager may help them to have control over some or all execution tasks in their session, applications, or frameworks.

In many multithreaded server applications or frameworks the threads, task, or sub-tasks that may be run and exist in one point of time may occasionally go out of control and can lead to a leak of resources (e.g., memory, computing cycles, etc.). In such an embodiment, a Session Manager may solve such undesirable actions and may be used to register, monitor and maintain all or at least a selected set of execution tasks. In various embodiments, in order to have better control over all started tasks server sessions, applications, and/or frameworks may delegate such a management task to Session Manager, as described below.

In various embodiments, such a Session Manager may provide an easy to use interface to server applications or frameworks. In such an embodiment, such a single point of access may provide a central repository for all running or registered tasks or sessions. In various embodiments of the disclosed subject matter the session manager may be configured to register a session with session (execution) context; unregister a session; return all active sessions; return a least part of a session context for active session; maintain limited number of active sessions, or, if registered sessions include a expiration time, remove an expired session, unblock waiting or stalled sessions, monitor sessions or task via new listeners or client, or control a session or task; although, it is understood that the above are merely a few illustrative examples to which the disclosed subject matter is not limited.

As described below, in various embodiments, a session manager may aid, help or guide privileged users (e.g., software architects, designers, developers, administrators, etc.) to take control over some sessions that are stopped (e.g., waiting of some user interaction, etc.) or monitor some long running tasks or sub-tasks. In such an embodiment, the executing systems may be prevented from leaking resources (e.g., memory, computing cycles, etc.) and better control over the executed tasks or sub-tasks of a session may be provided.

In various embodiments, users or clients may execute long running tasks or sessions in background mode. As described below, these clients may register listeners to that background process. In various embodiments, listeners may include the objects that are used for communication between background processes and clients. In such an embodiment, background processes or tasks may send messages to clients or users via these listeners.

For example, in one embodiment, background tasks may send "response needed" messages to a client or user. In such a case, the background task may stall or halt in a "wait" state until a response is sent by the client or user. In various embodiments, if a client dies or terminates prematurely, a background task may be blocked and resources used by that task may not be released. Although, it is understood that the above is merely one illustrative example to which the disclosed subject matter is not limited.

Various embodiments of the disclosed subject matter may solve or ameliorate such problems. For example, new clients may be assigned to a "waiting" background task list or category. In such an embodiment, using the session manager, a new client (e.g., the session manger) or listener could send a response or cancel messages and, therefore, unblock waiting background tasks. In this away the background task may be allowed to finish their tasks. Although, it is understood that the above is merely one illustrative example to which the disclosed subject matter is not limited.

As described below, in various embodiments, a Session Manager may include an interface or capability to return all active sessions in the system. Via this a user may browse all sessions, see the sessions that are in a "wait" or halted state. In one embodiment, the user may create or utilize new clients or listeners that may communicate with a selected "wait" task or sub-task and may resuscitate or instruct them to finish the task.

In various embodiments, an important role of a Session Manager in such an embodiment may include providing an access point to the session context of background sessions or tasks. In various embodiments, a session context may be stored via a communication client's objects or listeners. In such an embodiment, a "session take over" mechanism may replace the old invalid client's objects with new listeners, as described below. In such an embodiment, the new listener may send back new events that can release a background task from a blocking state.

FIG. 2 is a series of block diagrams of an example embodiment of a system 200 in accordance with the disclosed subject matter. In various embodiments, the system 200 may include a user 203, an administrator 201, and a process creation engine 202. In various embodiments, the process creation engine 202 may be configured to instantiate objects or components of the system 200.

In various embodiments, the user 203 may initiate the creation or activation of a session 204. In various embodiments, the system 200 may include the session 204, in an inactive or non-executed state until the user 203 activates or runs the session 204. In such an embodiment, the user 203 may also create or define the session 204 prior to activating it. In another embodiment, another user may define the session 204.

In some embodiments, the session 204 may include a grouped plurality of sub-tasks that are configured to be sequentially performed in order to accomplish a business management task. In some embodiments, the business management task may include ERP, CRM, SRM, PLM, SCM, etc. In various embodiments, the sub-tasks may include activities or jobs, such as, for example, manipulation of data associated with physical objects (e.g., people, inventory, etc.), execution of reports, scheduling activities, manipulation user privileges that dictate what data a user may access/control within the system 200, logging information regarding the session 204 or sub-task(s), etc. Although, it is understood that the above are merely a few illustrative examples to which the disclosed subject matter is not limited.

In one embodiment, the session 204 may be associated with or include a session context 206. In various embodiments, the session context 206 may include information regarding the session 204 and its execution or performance by the system 200. In some embodiments, the session context 206 may include one or more of the following: a list of event listeners associated with the session (e.g., event listeners 208), a session identifier 207 that substantially uniquely identifies the session 204, the execution status of the sub-tasks included in the session 204, and an indicator of configuration data associated with the session 204. Although, it is understood that the above are merely a few illustrative examples to which the disclosed subject matter is not limited.

In various embodiments, one or more event listeners 208 (or simply "listeners") may be associated or bound to the session 204. In some embodiments, the event listeners 208 may be configured to receive and/or process event notification messages produced by the session 204 or as a result of the execution of the session 204. In some embodiments, an event, in this context, may include an indication that something of note has happened during the processing or execution of a certain task or sub-task. In various embodiments, an event may include, for example, an execution error, a processing exception, a completion of a sub-task, a warning message produced by or in response to a sub-task, etc.; although, it is understood that the above is merely one illustrative example to which the disclosed subject matter is not limited. In some embodiments, an event may include information regarding what type of event it is, when the event occurred, who or what caused the event to occur, etc.

In various embodiments, session 204 may be registered with the session manager 210. In various embodiments, the session manager 210 may be configured to manage, monitor, and/or control sessions (e.g., session 204). In some embodiments, the system 200 may include a plurality of sessions, of which session 204 is merely a representative example. In one embodiment, the session manager 210 may be configured to facilitate or allow an administrator 201 or other user to manage, monitor, and/or control of sessions (e.g., session 204).

FIG. 2b is a block diagram of an example embodiment of a system 200 in accordance with the disclosed subject matter, in which the administrator 201 has taken control of the session 204. As described below, in various embodiments, the administrator 201 may take control of the session 204. In one such embodiment, this may include relieving the user 203 of control of the session 204. In another embodiment, this may include substantially simultaneous monitoring and/or control of the session 204 by both the user 203 and the administrator 201.

In various embodiments, the session manager 210 may create a new set of event listeners 212 to replace the prior event listeners 208. The replacement listeners 208 may, in one embodiment, be substantially equivalent, from the session's 204 point of view, to the prior event listeners 208. In various embodiments, the session manager 210 may disassociate the prior event listeners 208 from the session 204, and associate the replacement listeners 212 with the session 204 instead. In various embodiments (not illustrated), the new set of event listeners 212 may not replace the prior event listeners 208, but instead augment or substantially simultaneously listen for events generated by or as a result of the session 204. In such an embodiment, both the user 203 and the administrator may monitor and/or control the session 204.

Figure 2C:
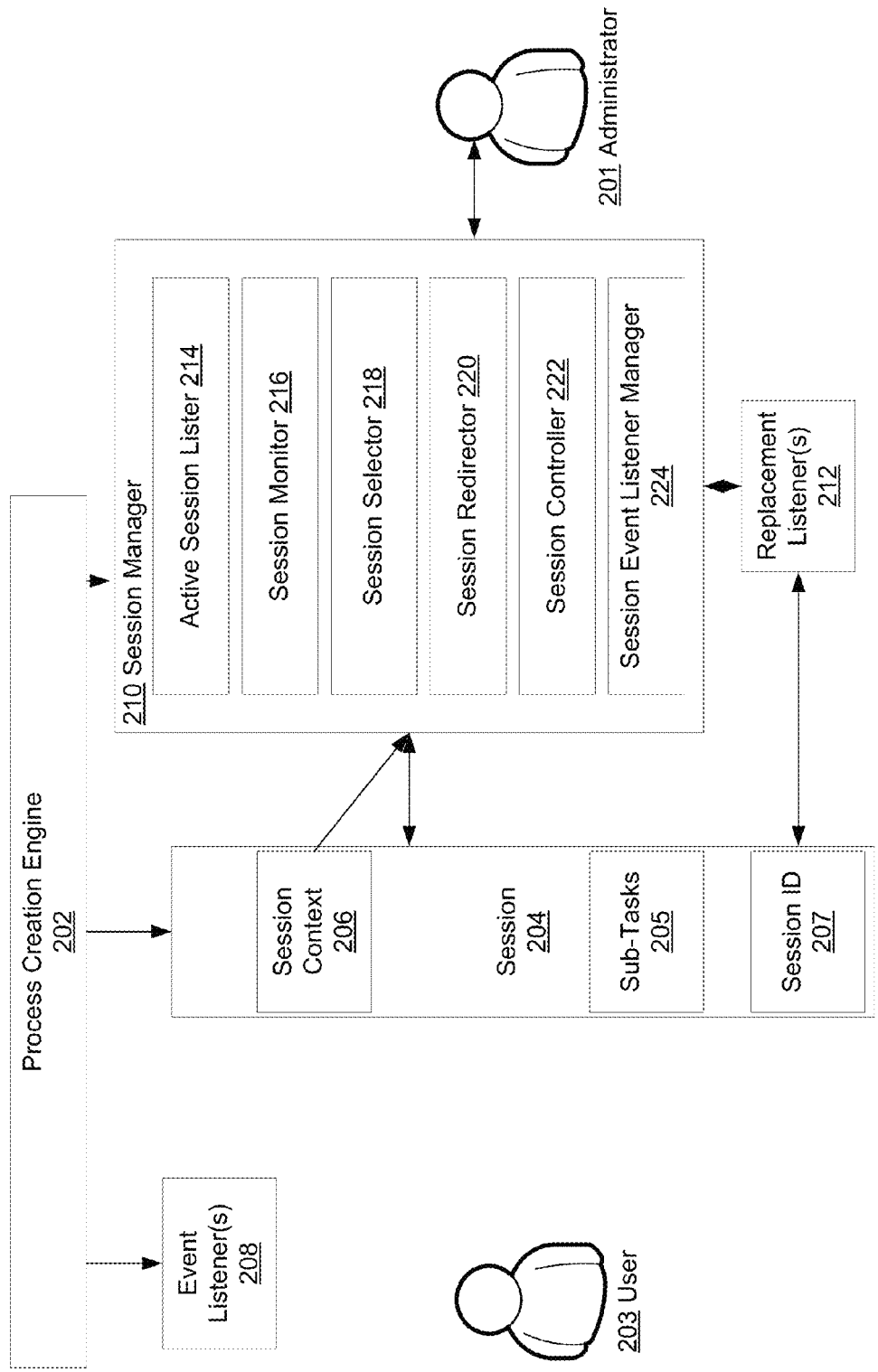
FIG. 2 is a series of block diagrams of an example embodiment of a system in accordance with the disclosed subject matter.

FIG. 2c is a block diagram of an example embodiment of a system 200 in accordance with the disclosed subject matter, in which additional components of the session manager 210 are detailed. In various embodiments, the session manager 210 may include one or more of the following: an active session lister 214, a session monitor 216, a session selector 218, a session redirector 220, a session controller 222, and a session event listener manager 224.

In various embodiments, the active session lister 214 may be configured to receive notification messages pertaining to the activation and deactivation events of a session (e.g., session 204). In one embodiment, the active session lister 214 may maintain a list of the active sessions (e.g., session 204) that are currently active or being executed by the system 200. In some embodiments, the active session lister 214 may also maintain a list of deactivated (e.g., halted, sleeping, retired, completed, etc.) sessions included by the system 200.

In some embodiments, the active session lister 214 may be configured to receive an activation event message that includes the session ID 207 associated with the activated session (e.g., session 204). Likewise, upon the completion, deletion or otherwise retiring event of the session 204, in one embodiment, the active session lister 214 may receive an event notification message indicating that the session 204 is no longer active.

In another embodiment, as opposed to embodiments which include a listener model in which information is pushed or transmitted to the active session lister 214, the active session lister 214 may pull of request information regarding the status (e.g., active, deactive, etc.) of a session. In one such embodiment, the active session lister 214 may receive the session ID 207 of a session 204 when the session 204 is first activated. Using this session ID 207, the active session lister 214 may, in one embodiment, poll or request status information from the session 204.

In various embodiments, the Session Selector 218 may be configured to indicate a session which has been selected, from among the list of active sessions, for further monitoring or controlling. In some embodiments, the Session Selector 218 may include or receive indications from user interface (UI) elements employed by the Administrator 201.

In one embodiment, the Session Monitor 216 may be configured to facilitate the monitoring of a session (e.g., session 204) by the session manager 210 or an administrator 201. In such an embodiment, the Session Monitor 216 may be configured to coordinate the redirection of session information and the creation of replacement listeners 212, such that both the user 203 and the administer 201 may monitor the status and execution of the session 204.

In another embodiment, the Session Controller 222 may be configured to facilitate the removal of the control of a session (e.g., session 204) from the user 203 to the session manager 210 or an administrator 201. In such an embodiment, the Session Controller 222 may be configured to coordinate the redirection of session information and the creation of replacement listeners 212, from the user 203 to the administer 201. In some embodiments, the Session Controller 222 may be configured to facilitate substantially simultaneous control of the session 204 by both the user 203 and the administrator 201. In various embodiments, the Session Monitor 216 and the Session Controller 222 may be integrated into a single element.

In various embodiments, the Session Redirector 220 may be configured to acquire information regarding the session 204 (e.g., the session context 206, in whole or part, etc.). In one embodiment, the Session Redirector 220 may be configured to provide at least a portion of this information to the Session Monitor 216 and the Session Controller 222. In some embodiments, Session Redirector 220 may be configured to provide event listener information to the Session Event Listener Manager 224.

In some embodiments, the Session Event Listener Manager 224 may be configured to manage and control event listeners (e.g., replacement listeners 212) associated with the session manager 210. In various embodiments, the Session Event Listener Manager 224 may be configured to manage and/or control event listeners (e.g., event listeners 208) also associated with the monitored or controlled Session (e.g., Session 204). In various embodiments, the Session Event Listener 224 may be configured to create the new (e.g., replacement) event listeners 212. In various embodiments, the Session Event Listener 224 may be configured to associate the Session 204 with the new (e.g., replacement) event listeners 212, such that event notification messages may be received and processed by the Session Manager 210 or the new (e.g., replacement) event listeners 212. Also, in one embodiment (e.g., one in which the Session Manager 210 takes control of a Session 204), the Session Event Listener 224 may be configured to disassociate the previous event listeners 208 from the Session 204.

FIG. 3 is a block diagram of an example embodiment of a system 300 in accordance with the disclosed subject matter. In various embodiments, the system 300 may include a process creation engine 308, a session manager 302, a session 304, and a session context 306. FIG. 3 illustrates one embodiment of the start-up or creation process of the session manager 302 and a session 304; although, it is understood that the above is merely one illustrative example to which the disclosed subject matter is not limited.

Action 310 illustrates that, in one embodiment, the process creation engine 308 may create, instantiate, or start-up the session manager 302. In various embodiments, the process creation engine 308 may be configured to perform this action upon the start-up of the system 300. In various embodiments, the Session Manger 302 may await the creation, instantiation or activation of sessions (e.g., session 304) to manage. In various embodiments, the session manager 302 may be configured to utilize or consume a minimum amount of system resources while awaiting a session to manage.

Action 312 illustrates that, in one embodiment, the process creation engine 308 may be configured to create, instantiate or start-up a session (e.g., session 304). In various embodiments, a user may select a session to execute or perform. In some embodiments, the process creation engine 308 may enqueue the sub-tasks of the session 304 for processing or execution. In various embodiments, the session 304 may be configured to process or execute its included sub-tasks.

Action 314 illustrates that, in one embodiment, the process creation engine 308 may be configured to create a session context 306 that is associated with the session 304. As described above, in various embodiments, the session context 306 may include information regarding the session 304 and its execution or performance by the system 300. In some embodiments, the session context 306 may include one or more of the following: a list of event listeners associated with the session, a session identifier that substantially uniquely identifies the session 304, the execution status of the sub-tasks included in the session 304, and an indicator of configuration data associated with the session 304.

Action 316 illustrates that, in one embodiment, that a set of event listeners may be associated or bound with the session 304 via the session context 306. In various embodiments, this may be done by the process creation engine 308. In another embodiment, this may be done by the session 304. In various embodiments, the selection of event listeners may be based upon the type of sub-tasks include in the session 304 (e.g., a report finished event listener, a log creation event listener, etc.). In another embodiment, some or all of the event listeners may be default or predetermined event listeners (e.g., an error event listener, etc.).

Action 318 illustrates that, in one embodiment, that the session 304 may be registered with the session manager 302. In some embodiments, the session context 306 may also be registered with the session manager 302. In various embodiments, this may be done by the process creation engine 308 or the session 304 itself. In various embodiments, the registration may include providing the session ID of the session 304 to the active session listener or other component of the session manger 302.

Figure 4:
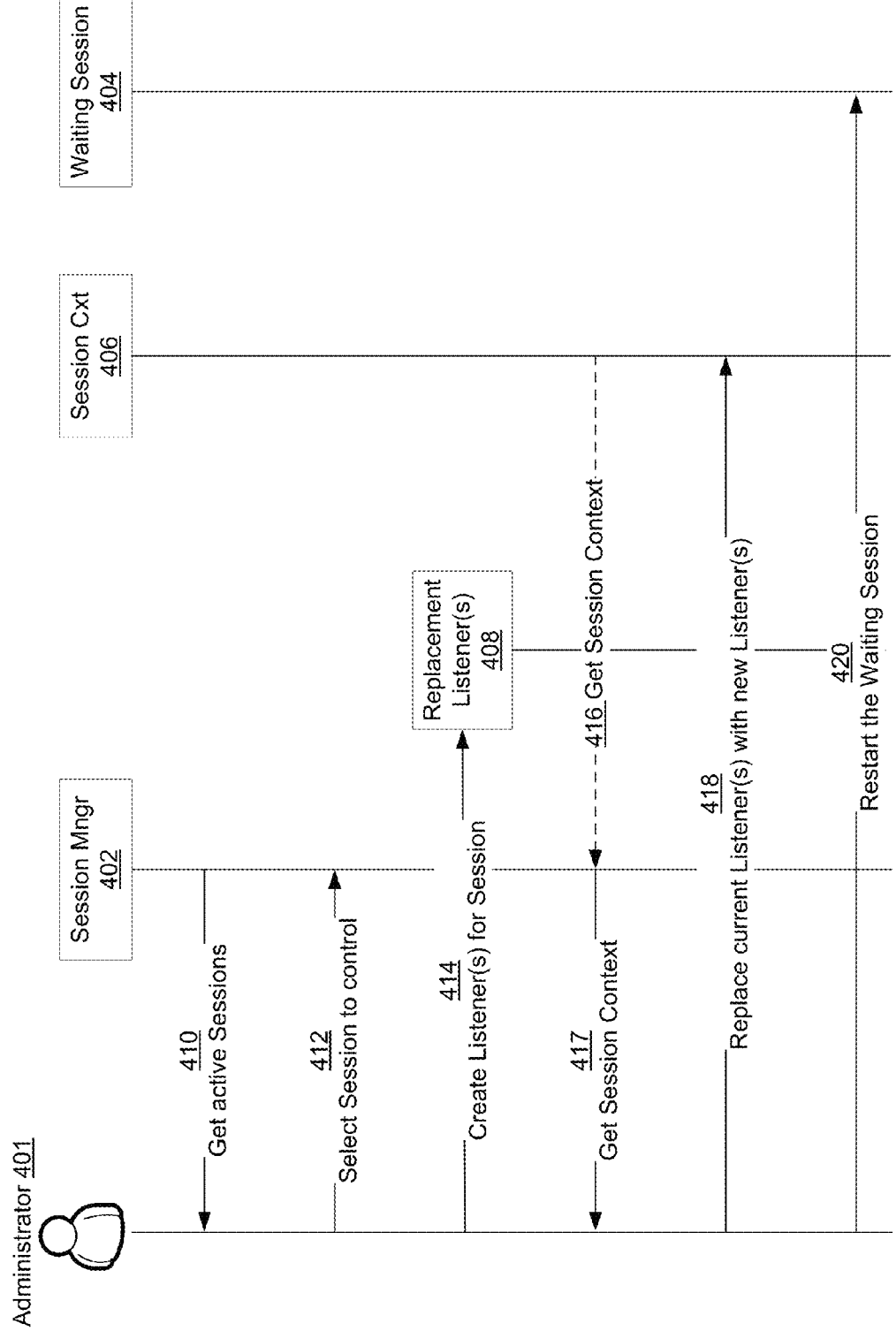
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may include an administrator or privileged user 401, a session manager 402, a session 404, a session context 406, and at least one replacement event listener 408. FIG. 4 illustrates one embodiment of employing the session manager 402 to control a session 404 and more specifically to revive a stalled or waiting session 404; although, it is understood that the above is merely one illustrative example to which the disclosed subject matter is not limited.

Action 410 illustrates that, in one embodiment, the administrator 401 may get or retrieve a list of the active sessions currently being executed or performed by the system 400. In various embodiments, the session manager 402 may maintain a list of active or executing sessions. In such an embodiment, the session manager 402 may provide a user interface (UI) configured to display at least a portion of the list of active sessions.

Action 412 illustrates that, in one embodiment, the administrator 401 may select a session to control. In various embodiments, a particular session (e.g., session 404) may be stalled or waiting, such that the business management tack accomplished by session 404 is only particularly completed. For example, a sub-task may have failed to complete, completed with an error message, or the session 404 may have been manually or automatically paused or suspended; although, it is understood that the above are merely a few illustrative examples to which the disclosed subject matter is not limited. In other embodiments, the administrator 401 may wish or desire to control a session for other reasons.

In various embodiments, the session manager 402 may be configured to provide a UI element or elements configured to facilitate the selection of a session to control by the administrator 401. In various embodiments, the UI element may allow the selection of a session from among the list of active sessions provided by Action 410.

Action 414 illustrates that, in one embodiment, a set of replacement event listeners may be created for the to-be-controlled session 404. In some embodiments, this may include retrieving information regarding the session's 404 current event listeners from the session context 406. In such an embodiment, the session manager 402 may have a better understanding of the types of replacement event listeners that are to be created. In another embodiment, the types of replacement event listeners may be predetermined or standardized. In various embodiments, the creation of the set of replacement listeners may include administrator's 401 input and interaction, and subsequent creation via the session manager 402. In another embodiment, the creation of set of replacement listeners may be done automatically by the session manger 402.

Action 416 illustrates that, in one embodiment, the session manager 402 may be configured to retrieve the session context 406, in whole or part, of the session 404. In various embodiments, this action may occur prior to action 414. In another embodiment, the action 416 may include a series of data transfers. In various embodiments, the session context 406 itself may not be retrieved but merely information included by the session context 406.

Action 417 illustrates that, in one embodiment, at least some of the information included in the retrieved session context 406 or information of session context 406. In various embodiments, the session manager 402 may include a UI to display the session context 406 information. As described below, in various embodiments, the information may include the sub-tasks included by the session 404 and the execution status of each of these sub-tasks.

Action 418 illustrates that, in one embodiment, the current event listeners associated with the session 404 may be replaced, in whole or part, by the replacement event listeners created as part of Action 414, as described above. In various embodiments, initiation of this action may include user input from the administrator 401. In another embodiment, the initiation of this action may automatically be performed by the session manager 402 by virtue of the selection of the session 404 in Action 414. In various embodiments, the replacement may include disassociating the current event listeners from the session 404, and associating the new replacement event listeners with the session 404. In various embodiments, the new replacement listeners may be managed or controlled by the session manager 402, such that events generated by or as a result of the session 404 are received or brought to the attention of the session manager 402.

Action 420 illustrates that, in one embodiment, the administrator 401 may control and edit the sub-tasks included within the session 404. In such an embodiment, the session manager 402 may be configured to receive commands from the administrator (e.g., via a UI) and execute or perform those commands on the session 404 or session context 406.

In the illustrated embodiment, the administrator 401 may wish or desire to restart the stalled or waiting session 404. In such an embodiment, the administrator 401 may determine the reason that the session 404 has become stalled (e.g., a sub-task failed to complete, an error occurred while processing a sub-task, a user paused the session, etc.). In various embodiments, the administrator 401 may edit the sub-task (and therefore the session 404 or session context 406). For example, if a sub-task is unable to complete due to a missing file, the administrator 401 may inform the sub-task of a new location for the file. In turn, in such an embodiment, the session manager 402 may edit the sub-task portion of the session 404 or session context 406 to reflect the new location. The administrator 401 may then restart the previously errored sub-task. Once again the session manager 402 may implement the administrator's 401 command(s). In one embodiment, the session manager 402 may edit a sub-task execution status portion of the session context 406 to reflect that the sub-task in question has not been run or executed, or is to be performed. Although, it is understood that the above is merely one illustrative example to which the disclosed subject matter is not limited.

Figure 5:
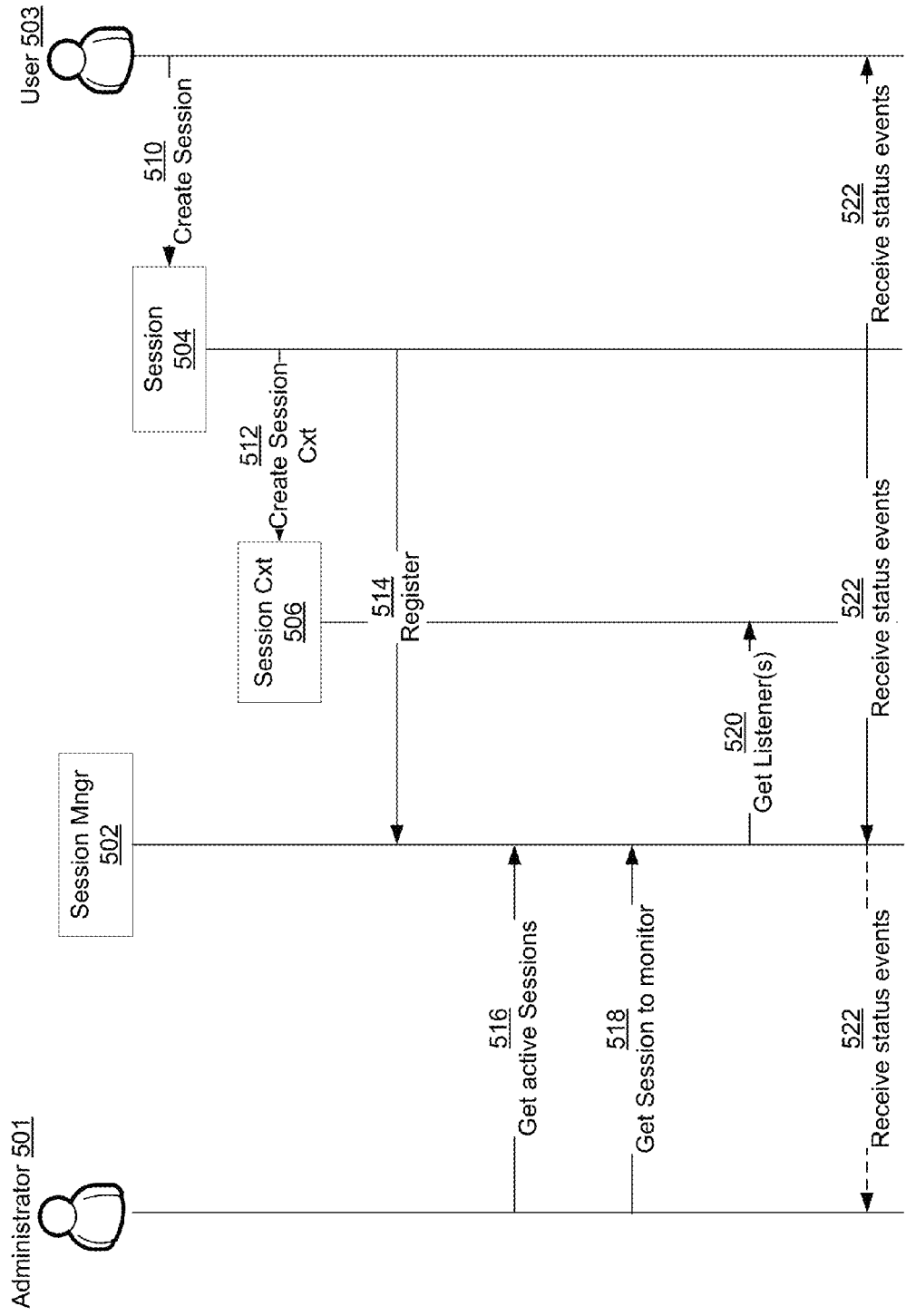
FIG. 5 is a block diagram of an example embodiment of a system in accordance with the disclosed subject matter.

FIG. 5 is a block diagram of an example embodiment of a system 500 in accordance with the disclosed subject matter. In various embodiments, the system 500 may include an administrator or privileged user 401, a user 503, a session manager 502, a session 504, and a session context 506. FIG. 5 illustrates one embodiment of employing the session manager 502 to monitor a session 504; although, it is understood that the above is merely one illustrative example to which the disclosed subject matter is not limited.

Action 510 illustrates that, in one embodiment, the user 503 may create or start a session 504. In various embodiments, the user 503 may select a session 504 to execute in order to achieve a given task. In such an embodiment, the user 503 may cause the sub-tasks included in the session 504 to be performed.

Action 512 illustrates that, in one embodiment, the session context 506 may be created. In various embodiments, the session context 506 may be created by or as a result of the creation of the session 504. In another embodiment, another entity (e.g., a process creation engine, etc.) may create the session context 506.

Action 514 illustrates that, in one embodiment, the session 504 may be registered with the session manager 502. In various embodiments, the registration may occur as a result of the creation of the session 504. In another embodiment, another entity (e.g., a process creation engine, etc.) may register the session 504.

Action 516 illustrates that, in one embodiment, an administrator or other user 501 may get or retrieve a list of the active sessions currently being executed or performed by the system 500, as described above. Action 518 illustrates that, in one embodiment, the administrator or other user 501 may select a session (e.g., session 504) to monitor. In some embodiments, this may occur similarly to the controlling Action 412 described above. In one embodiment, this may include the use of the session identifier associated with the session 504, as described above. In various embodiments, the session manager 502 may be configured to provide a UI element or elements to facilitate the selection of a session to control by the administrator 501. In various embodiments, the UI element may allow the select of a session from among the list of active sessions provided by Action 516.

Action 520 illustrates that, in one embodiment, the session manager 502 may get or acquire a list or other representation of the active listeners or listener types employed by the session 504. In various embodiments, this action 520 may include the creation of new or supplemental (versus "replacement") event listeners. In various embodiments, these new or supplemental event listeners may be substantially equivalent to the old or primary event listeners (not illustrated) associated with the session 504. In various embodiments, these old or primary event listeners may have been created and associated as part of Actions 501 or 512, as described above. In some embodiments, this action 520 may also include associating the new or supplemental event listeners with the session 504 such that the new or supplemental event listeners are configured to receive event notifications pertaining to the session 504.

Action 522 illustrates that, in one embodiment, both the user 503 and the administrator 501 may receive status events pertaining to the monitored session 504. In one embodiment, both the user 503 and the administrator 501 may receive other non-listener based types of event notifications. In various embodiments, these event notifications may be received by user interfaces employed by the user 503 and the administrator 501, respectively. In various embodiments, the event notifications may be received by the event listeners, primary and supplement, associated with the session 504. In one embodiment, the supplemental event listeners may be represented by the session manager 502 or forward the notice or messages resulting from the event notices to the session manager 502. The primary event listeners and the UI dealing with them are illustrated by the user 503, in FIG. 5.

Figure 6:
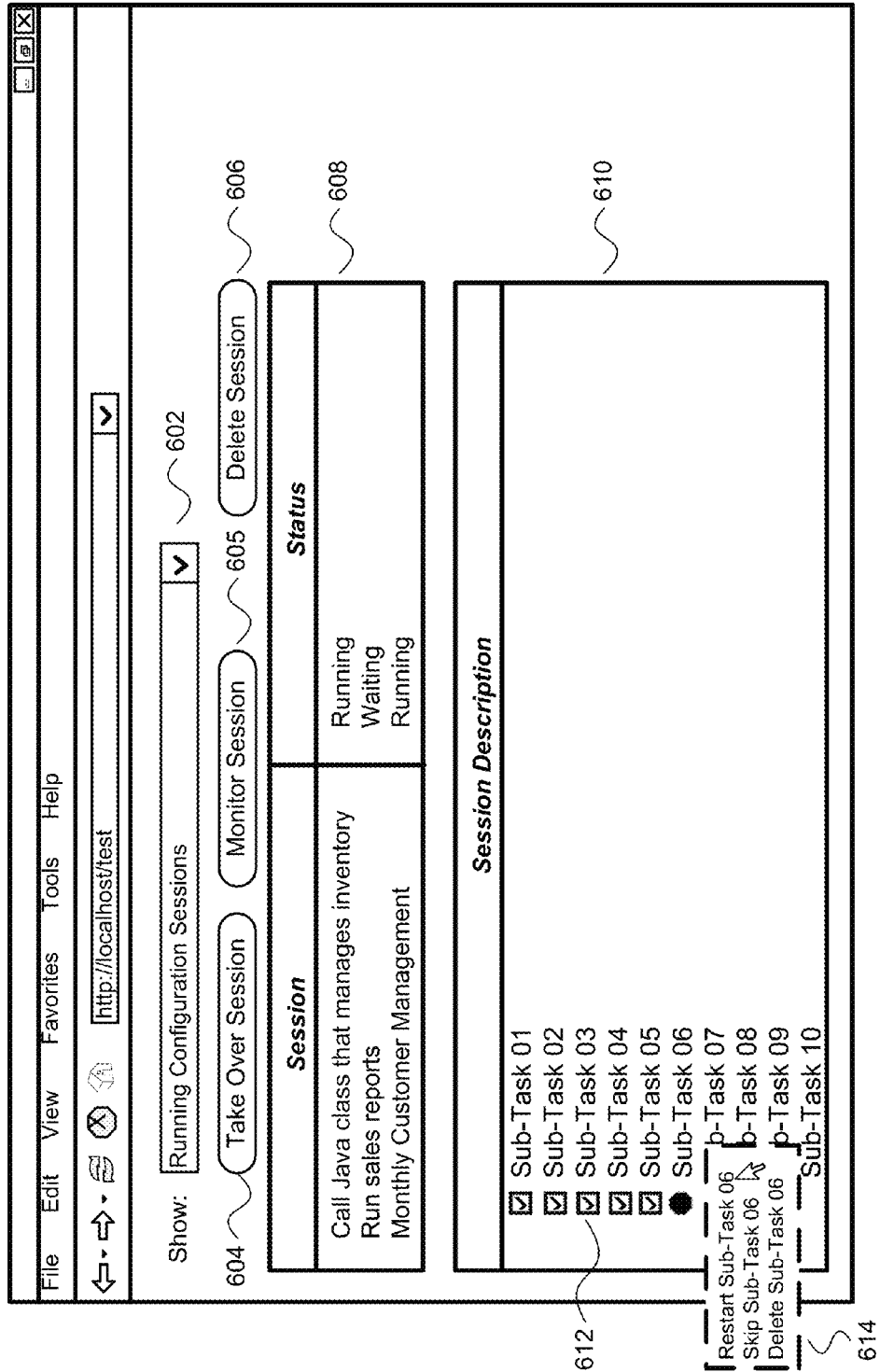
FIG. 6 is a diagram of an example embodiment of a user interface in accordance with the disclosed subject matter.

FIG. 6 is a diagram of an example embodiment of a user interface (UI) 600 in accordance with the disclosed subject matter. In various embodiments, this UI 600 or another embodiment of a UI may be employed by an administrator or other user to interact with a session manager. In some embodiments, the UI 600 may enable a user to control or monitor at least one session. In various embodiments, the UI 600 may specifically display a session ID associated with the session or, in another embodiment, the session ID may be hidden but used internally by the session manager.

In one embodiment, the UI 600 may include a first or filtering UI element 602 configured to facilitate the selection of a number of sessions to be displayed by the second or listing UI element 608. In various embodiments, the filtering UI element 602 may be configured to filter or select a sub-set of sessions to be displayed by the second or listing UI element 608. In such an embodiment, the filtering UI element 602 may include a list box or drop-down menu configured to display a plurality of filtering choices to a user or administrator. For example, in one embodiment, the filtering UI element 602 may allow a user to select to display a list of all: active sessions, completed sessions, inactive sessions, stalled or waiting sessions, running or executing sessions, types of sessions (e.g., configuration sessions, reporting sessions, etc.), monitored sessions, controlled session, etc.; although, it is understood that the above are merely a few illustrative examples to which the disclosed subject matter is not limited. In various embodiments, the filtration options may be configurable.

In one embodiment, the UI 600 may include a second or listing UI element 608 configured to list or otherwise represent at least one session that is registered with the session manager. In various embodiments, the list of sessions shown by the listing UO element 608 may include a sub-set of all the sessions registered with the session manager. In such an embodiment, this sub-set may be based upon the selection made via the first or filtering UI element 602, as described above. In one embodiment, the listing UI element 608 may include a session ID, name or title, such that the session may identified by the user or administrator. In one embodiment, the listing UI element 608 may include a short description of the status (e.g., running, waiting, completed, etc.) of each session. In various embodiments, each session may be selectable. In such an embodiment, the listing UI element 608 may include a list box or other UI element type.

In one embodiment, the UI 600 may include a one or more of action UI elements such as buttons 604, 605, and 606. In various embodiments, these action UI elements or buttons may be configured to select an action to perform on a selected session. In various embodiments, a user may select a session via the listing UI element 608 and then select an action to perform via the action UI elements. In various embodiments, the action UI elements may include buttons, check boxes, right-click/context menu, or other UI elements. For example, in various embodiments, if a user wishes to control or take over a session, button 604 may be employed. In another embodiment, if a user wishes to monitor a session, button 605 may be employed. In yet another embodiment, if a user wishes to delete a session, button 606 may be selected. It is understood that the above are merely a few illustrative examples to which the disclosed subject matter is not limited.

In various embodiments, the UI 600 may include a third or detailed UI element 610 configured to display the sub-tasks of a selected session. In some embodiments, the detailed UI element 601 may include an iconic status indicator 612 for each task. In the illustrated embodiment, the successfully completed sub-tasks may have a check-marked iconic indicator associated with them, and a halted or stalled sub-task may have a stop-sign or octagon iconic indicator associated with it. In various embodiments, other iconic descriptors may be used, for example, for to be completed sub-tasks, skipped sub-tasks, etc.; although, it is understood that the above are merely a few illustrative examples to which the disclosed subject matter is not limited.

In various embodiments, the UI 600 may include a fourth or context menu UI element 614 that may be configured to display a plurality of options for controlling sub-tasks illustrated by UI element 610. In one embodiment, a user may restart, skip, or delete a selected sub-task (e.g., sub-task 06); although, it is understood that the above are merely a few illustrative examples to which the disclosed subject matter is not limited.

FIG. 7 is a flow chart of an example embodiment of a technique in accordance with the disclosed subject matter. In various embodiments, the technique 700 may be used or produced by the systems such as those of FIG. 1, 2, 3, 4, or even 5. In some embodiments, the technique 700 may make use of or employ a user interface such as that of FIG. 6. Although, it is understood that the above are merely a few illustrative examples to which the disclosed subject matter is not limited.

Block 702 illustrates that, in one embodiment, a session manger may receive a registration notification that a session has been created and is scheduled to be performed by a system that includes session manger, as described above. In various embodiments, the registration notification may include a session identifier that substantially uniquely identifies the session within the system, as described above. In various embodiments, the action(s) illustrated by this block may be performed by the session manager 210 or active session lister 214 of FIG. 2, the session managers of FIGS. 3, 4, and/or 5, as described above.

Block 704 illustrates that, in one embodiment, the session manager may acquire a list of active sessions, as described above. In one embodiment, acquiring may include acquiring a list of session identifiers, wherein each session identifier substantially uniquely identifies an active session that is currently being performed by a system that includes the session manager, as described above. In various embodiments, the action(s) illustrated by this block may be performed by the session manager 210 or active session lister 214 of FIG. 2, the session managers of FIGS. 3, 4, and/or 5, or via the user interface elements 602 or 608 of FIG. 6, as described above.

Block 706 illustrates that, in one embodiment, the session manager may receive a selection of one of the sessions to supervise, as described above. In various embodiments, supervising may include controlling or monitoring, as described above. In one embodiment, receiving a selection of a session to supervise may include receiving, from a user, an indication of the selected session; determining a session identifier associated with the selected session; and accessing the selected session via the session identifier, as described above. In various embodiments, the action(s) illustrated by this block may be performed by the session manager 210, session controller 222, or session monitor 216 of FIG. 2, the session managers of FIGS. 3, 4, and/or 5, or via the user interface elements 604, 605 or 606 of FIG. 6, as described above.

Block 708 illustrates that, in one embodiment, the session manager may retrieve a list of the at least one event listener(s) from a session context associated with the selected session, as described above. In various embodiments, retrieving a list of event listeners may include accessing the session context via a session identifier that substantially uniquely identifies the selected session, as described above. In one embodiment, retrieving may include retrieving a list of the at least one event listener from the session context, as described above. In one embodiment, retrieving may include creating substantially equivalent event listeners to the retrieved event listeners, as described above. In some embodiments, retrieving may include associating the created event listeners with the session, such that the created event listeners receive event notifications regarding the session, as described above.

In another embodiment, retrieving a list of event listeners may include retrieving a list of the at least one event listener from the session context, as described above. In such an embodiment, retrieving may include creating substantially equivalent event listeners to the retrieved event listeners. In various embodiments, retrieving may include associating the created event listeners with the session, such that the created event listeners receive event notifications. In some embodiments, retrieving may include disassociating the session from the retrieved event listeners, such that the retrieved event listeners no longer receive event notifications regarding the session, as described above. In various embodiments, the action(s) illustrated by this block may be performed by the session manager 210, session event listener 224 or session redirector 220 of FIG. 2, or the session managers of FIGS. 3, 4, and/or 5, as described above.

Block 710 illustrates that, in one embodiment, the session manager may receive events or information regarding events generated by the session, as described above. In various embodiments, the action(s) illustrated by this block may be performed by the session manager 210, session event listener 224 or replacement listeners 212 of FIG. 2, or the session managers of FIGS. 3, 4, and/or 5, as described above.

Block 712 illustrates that, in one embodiment, the session manager may edit the execution status of at least one of the sub-tasks included by the selected session, as described above. In various embodiments, editing may include restarting the execution of the sub-task, halting the execution of the sub-task, and/or skipping the execution of the sub-task, as described above. In various embodiments, the action(s) illustrated by this block may be performed by the session manager 210 or session controller 222 of FIG. 2, the session managers of FIGS. 3, 4, and/or 5, or via the user interface element 614 or 610 of FIG. 6, as described above.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 includes a volatile memory unit or units. In another implementation, the memory 104 includes a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, an input/output (I/O) device such as a display 154, a communication interface 166, and a transceiver 168, among other components. The device 150 may also be provided with a storage device, such as a micro-drive or other device, to provide additional storage. Each of the components 150, 152, 164, 154, 166, and 168, are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and display interface 156 coupled to a display 154. The display 154 may be, for example, a TFT LCD (Thin-Film-Transistor Liquid Crystal Display) or an OLED (Organic Light Emitting Diode) display, or other appropriate display technology. The display interface 156 may comprise appropriate circuitry for driving the display 154 to present graphical and other information to a user. The control interface 158 may receive commands from a user and convert them for submission to the processor 152. In addition, an external interface 162 may be provide in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may include secure information also. Thus, for example, expansion memory 174 may be provide as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152, that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, WiFi, or other such transceiver (not shown). In addition, GPS (Global Positioning System) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, as shown in the figure. For example, it may be implemented as a cellular telephone 180. It may also be implemented as part of a smart phone 182, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
acquiring, into a memory associated with a central session manager, a list of sessions, wherein each session includes a grouped plurality of sub-tasks that are configured to be sequentially performed, by being executed by a processor, in order to accomplish a business management task,
wherein the business management task includes one or more of Enterprise Resource Planning (ERP), Customer Relationship Management (CRM), Supplier Relationship Management (SRM), Product Lifecycle Management (PLM) and Supply Chain Management (SCM) tasks, wherein one or more event listeners are bound to each session, and wherein each event listener is configured to receive and process event notification messages produced by execution of sub-tasks of the bound session, and wherein the central session manager is configured to provide a single point of access to a central repository for all running and registered sessions of the listed sessions, register at least one of the listed sessions with session execution context, unregister at least one of the listed sessions, return all active sessions of the listed sessions, return at least part of a session context for at least one of the active sessions, maintain a limited number of the active sessions, remove an expired session of the listed sessions when the expired session has an expiration time, unblock a waiting or stalled session of the listed sessions, and monitor one or more of the listed sessions via new listeners;

receiving, at the central session manager, a selection of at least one or more active sessions of the listed sessions to supervise and access to respective session contexts established for the at least one or more active sessions of the listed sessions;

retrieving, at the central session manager, a respective list of event listeners associated with each of the active sessions from the respective session contexts established for the active sessions;

receiving, at the central session manager, events generated by all of the active sessions; and supervising, at the central session manager, resources for execution of sub-tasks in the selected session according to the received events.

2. The method of claim 1 wherein the plurality of sub-tasks include one or more of manipulation of data associated with physical objects, execution of reports, scheduling activities, manipulation user privileges that dictate what data a user may access/control, and logging information regarding the session.

3. The method of claim 1 wherein receiving a selection of a session to supervise includes: receiving, from a user, an indication of the selected session; determining a session identifier associated with the selected session; and accessing the selected session via the session identifier.

4. The method of claim 1 wherein retrieving a respective list of event listeners associated with each of the active sessions includes:
accessing the respective session context via a session identifier that uniquely identifies the session;
retrieving a list of the at least one event listener from the respective session context;
creating an equivalent event listener to the retrieved event listener; and
associating the created event listener with the session, such that the created event listener receives event notifications regarding the session.

5. The method of claim 1 wherein retrieving a respective list of event listeners associated with each of the active sessions includes:
retrieving a list of one event listener from the session context;
creating an equivalent event listener to the retrieved event listener;
associating the created event listener with the session, such that the created event listener receives event notifications; and
disassociating the session from the retrieved event listener, such that the retrieved event listener no longer receives event notifications regarding the session.

6. The method of claim 1 wherein receiving a selection of one of the sessions to supervise includes: receiving an indication that the selection is to be controlled by the session manager.

7. The method of claim 1 further comprising: editing the execution status of at least one of the sub-tasks included in the selected session.

8. The method of claim 1 further comprising: receiving, by the session manager, a registration notification that a session has been created and is scheduled to be performed by a system that includes a session manger; and wherein the registration notification includes a session identifier that uniquely identifies the session within the system.

9. An apparatus comprising:
a session lister configured to acquire a list of sessions, wherein each session includes a grouped plurality of sub-tasks that are configured to be sequentially performed in order to accomplish a business management task,
wherein the business management task includes one or more of Enterprise Resource Planning (ERP), Customer Relationship Management (CRM), Supplier Relationship Management (SRM), Product Lifecycle Management (PLM) and Supply Chain Management (SCM) tasks,
wherein one or more event listeners are bound to each session, and wherein each event listener is configured to receive and process event notification messages produced by execution of sub-tasks of the bound session;
a session selector configured to receive a selection of one of the one or more active sessions of the listed sessions to supervise and respective session contexts established for the one or more active sessions of the listed sessions; and
a central session event listener manager configured to:
provide a single point of access to a central repository for all running and registered sessions of the listed sessions, register at least one of the listed sessions with session execution context, unregister at least one of the listed sessions, return all active sessions of the listed sessions, return at least part of a session context for at least one of the active sessions, maintain a limited number of the active sessions, remove an expired session of the listed sessions when the expired session has an expiration time, unblock a waiting or stalled session of the listed sessions, and monitor one or more of the listed sessions via new listeners;
retrieve a respective list of event listeners associated with each of the active sessions from the respective session contexts established for the active sessions; and
receive event information generated by all of the active sessions,
wherein the session lister is configured to update the acquired list of sessions in response to the received event information.

10. The apparatus of claim 9 wherein the plurality of sub-tasks include one or more of manipulation of data associated with physical objects, execution of reports, scheduling activities, manipulation user privileges that dictate what data a user may access/control, and logging information regarding the session.

11. The apparatus of claim 9 wherein the session selector is configured to: receive, from a user, an indication of the selected session; determine a session identifier associated with the selected session; and access the selected session via the session identifier.

12. The apparatus of claim 9 wherein the session event listener manager is configured to:

access the session context via a session identifier that uniquely identifies the selected session;

retrieve a list of one event listener from the session context; create an equivalent event listener to the retrieved event listener; and associate the created event listener with the session so that the created event listeners receive event notifications regarding the session.

13. The apparatus of claim 9 wherein the session event listener manager is configured to:

retrieve a list of one event listener from the session context; create an equivalent event listener to the retrieved event listener;

associate the created event listener with the session, such that the created event listener receives event notifications; and disassociate the session from the retrieved event listener so that the retrieved event listener no longer receives event notifications regarding the session.

14. The apparatus of claim 9 wherein the session selector is configured to: receive an indication that the selection is to be controlled by the session manager.

15. The apparatus of claim 9 further including: a session controller configured to edit an execution status of at least one of the sub-tasks included by the selected session.

16. The apparatus of claim 15 wherein the session controller is configured to edit the execution status of one of the sub-task by either: restarting the execution of the sub-task, halting the execution of the sub-task, or skipping the execution of the sub-task.

17. The apparatus of claim 9 wherein the session lister is configured to: receive a registration notification that a session has been created and is scheduled to be performed by a system that includes the apparatus; and wherein the registration notification includes a session identifier that uniquely identifies the session within the system.

18. A computer program product, comprising a tangible and non-transitory computer usable medium having a computer readable program code embodied therein, said computer readable program code adapted to be executed to implement a method for managing a plurality of sessions, wherein each session includes a grouped plurality of sub-tasks that are configured to be sequentially performed in order to accomplish a business management task, said method comprising:

acquiring, by a central session manager, a list of sessions, wherein each session includes a grouped plurality of sub-tasks that are configured to be sequentially performed, by being executed by a processor, in order to accomplish a business management task, wherein the business management task includes one or more of Enterprise Resource Planning (ERP), Customer Relationship Management (CRM), Supplier Relationship Management (SRM), Product Lifecycle Management (PLM) and Supply Chain Management (SCM) tasks, wherein one or more event listeners are bound to each session, and wherein each event listener is configured to receive and process event notification messages produced by execution of sub-task of the bound, wherein the central session manager is configured to provide a single point of access to a central repository for all running and registered sessions of the listed sessions, register at least one of the listed sessions with session execution context, unregister at least one of the listed sessions, return all active sessions of the listed sessions, return at least part of a session context for at least one of the active sessions, maintain a limited number of the active sessions, remove an expired session of the listed sessions when the expired session has an expiration time, unblock a waiting or stalled session of the listed sessions, and monitor one or more of the listed sessions via new listeners;

receiving, by the central session manager, a selection of one or more active sessions of the listed sessions to supervise and access to respective session contexts established for the one or more active sessions of the listed sessions;

retrieving, by the central session manager, a respective list of event listeners associated with each of the active sessions from the respective session contexts established for the active sessions;

receiving, by the central session manager, events generated by all of the active sessions; and supervising, by the central session manager, resources for execution of sub-tasks in the selected session according to the received events.

\* \* \* \* \*